United States Patent

[11] 3,603,942

[72] Inventor Robert F. Heidecker
Longmont, Colo.
[21] Appl. No. 790,647
[22] Filed Jan. 13, 1969
[45] Patented Sept. 7, 1971
[73] Assignee International Business Machines Corporation
Armonk, N.Y.

[54] PREDIFFERENTIATED RECORDING
9 Claims, 6 Drawing Figs.

[52] U.S. Cl. ....................340/174.1G, 340/174.1 H
[51] Int. Cl. .................... G11b 5/04
[50] Field of Search .................... 340/174.1 G, 174.1 A, 174.1 B, 174.1 H

[56] References Cited
UNITED STATES PATENTS

| | | | |
|---|---|---|---|
| 3,035,255 | 5/1962 | Tuttle | 340/174.1 |
| 3,237,176 | 2/1966 | Jenkins | 340/174.1 |
| 3,264,623 | 8/1966 | Gabor | 340/174.1 |
| 3,276,033 | 9/1966 | Cogar et al. | 340/174.1 |
| 3,331,079 | 7/1967 | Reader | 340/174.1 |
| 3,356,934 | 12/1967 | Halfhill et al. | 340/174.1 |

*Primary Examiner*—Bernard Konick
*Assistant Examiner*—Vincent P. Canney
*Attorney*—Sughrue, Rothwell, Mion, Zinn & Macpeak

ABSTRACT: System and method for magnetic recording to produce a read voltage having transitions such as zero crossings representing the recorded data. No differentiation of the read voltage is necessary. High frequency switching of the write current is used at times to maintain the read voltage at a nearly constant amplitude, as well as producing the desired read data transitions.

INVENTOR
ROBERT F. HEIDECKER
BY Sughrue, Rothwell, Mion, Zinn & Macpeak
ATTORNEYS

PREDIFFERENTIATED RECORDING

BACKGROUND OF THE INVENTION

1. Field of the Invention

This invention relates to the recording of digital data on a magnetized medium.

2. Description of the Prior Art

Conventionally, digital data is magnetically recorded on a magnetized medium in such a manner that when the data is read back from the medium, the read voltage peaks contain the recorded information. It is conventional to recover the information from the read voltage by differentiating the read voltage. But differentiation increases the noise in the system while recovering the information. It is also difficult to construct an integrated circuit differentiator, thereby presenting a problem which could be avoided if the differentiator were not necessary.

The prior art system also has difficulty when the read head is out of contact with the tape, thereby varying the apparent intensity of the flux waveform and varying the actual position of the peak read voltage.

SUMMARY OF THE INVENTION

The present invention is a system and method for magnetic recording of digital data on a medium such as tape, disc or drum. The disadvantages of the prior art systems are avoided by a process of predifferentiation. A system is provided for processing the information before recording to yield a write-head current which will produce a flux pattern on the medium, which, when read out by a read head, contains the information in the transitions, such as zero-crossings, rather than in the peaks. For example, the presence or absence of a zero-crossing between two read-clock pulses indicates the presence or absence of a binary ONE.

This system has several advantages. It allows recording at high densities with minimum phase shift in the readback signal. Because no differentiation of the read signal is required, the system is less noise-sensitive and is more easily adaptable to construction with integrated circuits. Compensation of the read amplifier circuits can be eliminated.

There is less difficulty with out-of-contact reading. While variation in the distance from the read head to the tape can affect the apparent intensity of the flux waveform, it has little effect on the apparent polarity of the flux waveform, from which zero-crossing indications are derived.

The readback voltage has a one-to-one dynamic range, as opposed to a two-to-one dynamic range common in prior art systems. Unlike the prior art systems, the present system can record on a previously magnetized medium, on thick as well as thin media, without the necessity of previous erasure.

DESCRIPTION OF THE PREFERRED EMBODIMENTS

Figure 1:
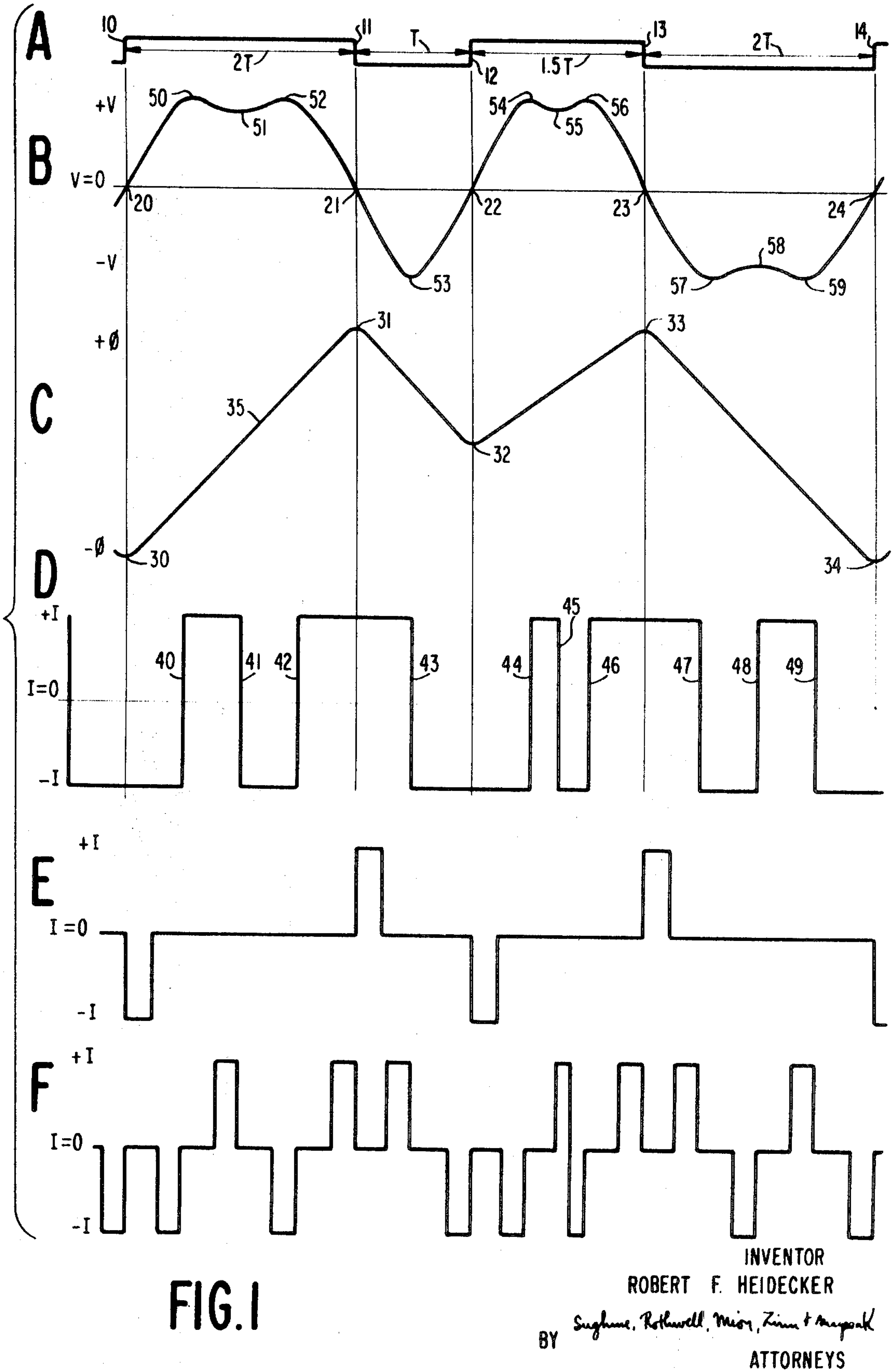
FIGS. 1A–1F are waveform diagrams illustrating the principle of the invention.

FIGS. 1A through 1F are waveform diagrams used to explain the principle of the invention. FIG. 1A corresponds to the desired coded pattern of digital indications. Although the form of this pattern can be varied to suit any system of recording, the pattern illustrated would in a MFM (modified frequency modulation) recording system. The periods of the recorded patterns are illustrated as T, 1.5T and 2T, although other periods could be used. The waveform of FIG. 1A has zero-crossing at 10, 11, 12, 13 and 14.

FIG. 1B illustrates a desired read voltage from a read head, which, when amplified and limited, could yield a wave as illustrated in FIG. 1A. The zero-crossings, or reversals of polarity, at points 20–24 in FIG. 1B correspond respectively to the zero-crossing 10–14 in FIG. 1A. The maximum amplitude of the read voltage should be approximately the same during both long and short periods.

FIG. 1C illustrates the effective flux on the medium which would produce the read voltage of FIG. 1B. Flux peaks 30–34 correspond in time respectively to zero crossings 20–24. The slope of the effective flux vs. time curve of FIG. 1C should be fairly constant between flux peaks, for example in region 35, so that the maximum read voltage amplitudes will be fairly constant.

FIG. 1D illustrates one type of write current waveform which can be used by a write head to generate an effective flux as illustrated in FIG. 1C. It is noteworthy that the transitions 40–49 of the write current correspond respectively to inflection points 50–59 in the read voltage. For example, inflection point 51 in FIG. 1B corresponds to transition 41 in FIG. 1D. Transitions 40 and 42 are mathematically unnecessary to arrive at the curve of FIG. 1A. But because any actual magnetic medium has a saturation point and cannot be magnetized indefinitely at the same rate of change, it becomes advantageous to have, in FIG. 1B, periodic reversals of the write current direction. These reversals maintain the read voltage at a nearly constant peak amplitude, with only slight variation back and forth between inflection points, like points 50, 51 and 52. With high-frequency oscillations, such as between transitions 44, 45 and 46, the readout voltage remains more nearly constant such as between inflections 54, 55 and 56.

The high-frequency or short-term transitions in the write signal are somewhat smoothed in passing through the write and read apparatus, resulting from response characteristics of circuitry, including heads, which cannot respond fast enough to reverse the direction of change for the flux transitions but can affect the amount of slope. The long term or low frequency input signals effect the major flux transitions as modified by the high-frequency components.

FIGS. 1E and 1F represent alternative forms of write current waveforms which could be used in place of that of FIG. 1D to generate the flux waveform of FIG. 1C.

Figure 2:
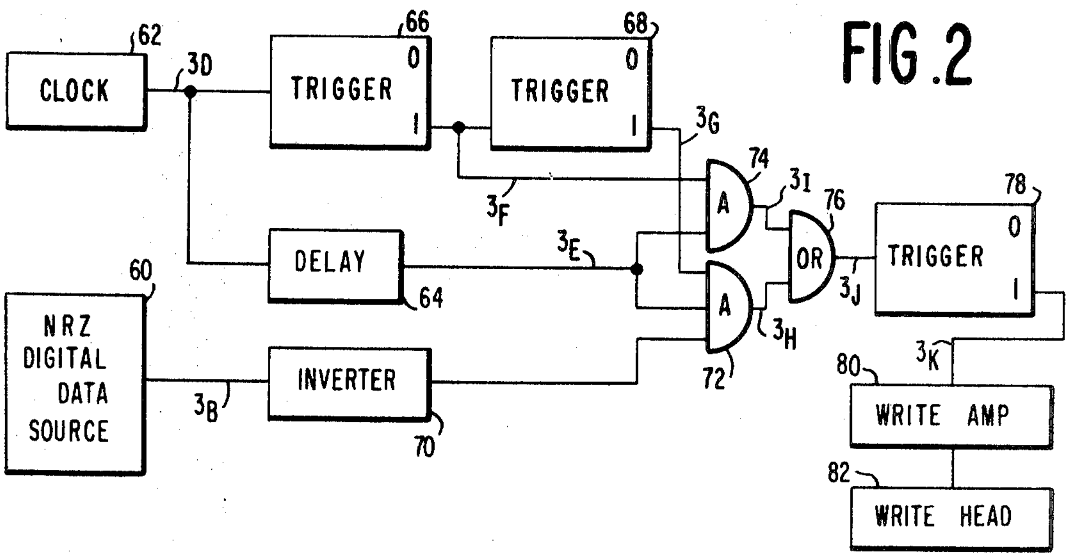
FIG. 2 is a block diagram of an uncompensated system according to the invention.

FIG. 2 represents an uncompensated system for writing digital data in a predifferentiated mode, and FIGS. 3A–3M represent various waveforms associated with the system of FIG. 2.

FIG. 3A represents the bits to be recorded at various times. FIG. 3B represents the NRZ (nonreturn to zero) digital data corresponding to the bits of FIG. 3A. FIG. 3C represents the FM (frequency modulated) version of the data of FIG. 3B. FIG. 3D is a train of clock pulses, arranged to occur four to a bit-cycle beginning at each bit transition time.

In the system of FIG. 2, the data as shown in FIG. 3B is provided by an NRZ digital data source 60 on line 3B. Throughout FIG. 2, the line numbers beginning with 3 correspond to the figure numbers of the signals on those lines. A clock 62 provides a clock signal on line 3D corresponding to FIG. 3D.

A delay element 64 provides a short delay for the clock signal, generating the signal of FIG. 3E to allow for settling of triggers 66 and 68. Trigger 66 receives the clock pulses and divides the clock intervals into successive intervals when trigger 66 is OFF AND ON, as shown in FIG. 3F. Trigger 68 receives the signal from trigger 66 and further divides by two to produce the signal of FIG. 3G.

The data source signal on line 3B is provided to an inverter 70 to provide an inverted NRZ data signal. The delayed clock on line 3E, the second trigger signal on line 3G and the inverter output signal are applied to an AND gate 72 to generate a signal on line 3H corresponding to FIG. 3H. This signal corresponds to a zero bit and indicates to succeeding stages that no crossover is expected in the corresponding readout clock interval. FIG. 3H represents the data alone, without any timing signals.

The corresponding timing signals are shown in FIG. 3I as generated in AND gate 74. AND gate 74 receives the first trigger signal on line 3F and the delayed clock signal on line 3E. The timing signals on line 3I and the data signals on line 3H are combined in an OR gate 76 to generate on line 3J the signal shown in FIG. 3J. This signal is applied to trigger 78 to generate on line 3K the write signal shown in FIG. 3K. This write signal is then amplified in amplifier 80 to produce a corresponding write current for application to write (recording) head 82, thereby recording on the medium.

When the recording is read back, the read voltage is as shown in FIG. 3L, producing zero-crossings as indicated in FIG. 3M. These zero-crossings, without any differentiation, correspond to the zero-crossings of the FM signal in FIG. 3C. The FM signal of FIG. 3C contains the same data as does the NRZ signal of FIG. 3B, in a different signal form. Thus, the recorded signal has been predifferentiated.

Figures 4, 6:
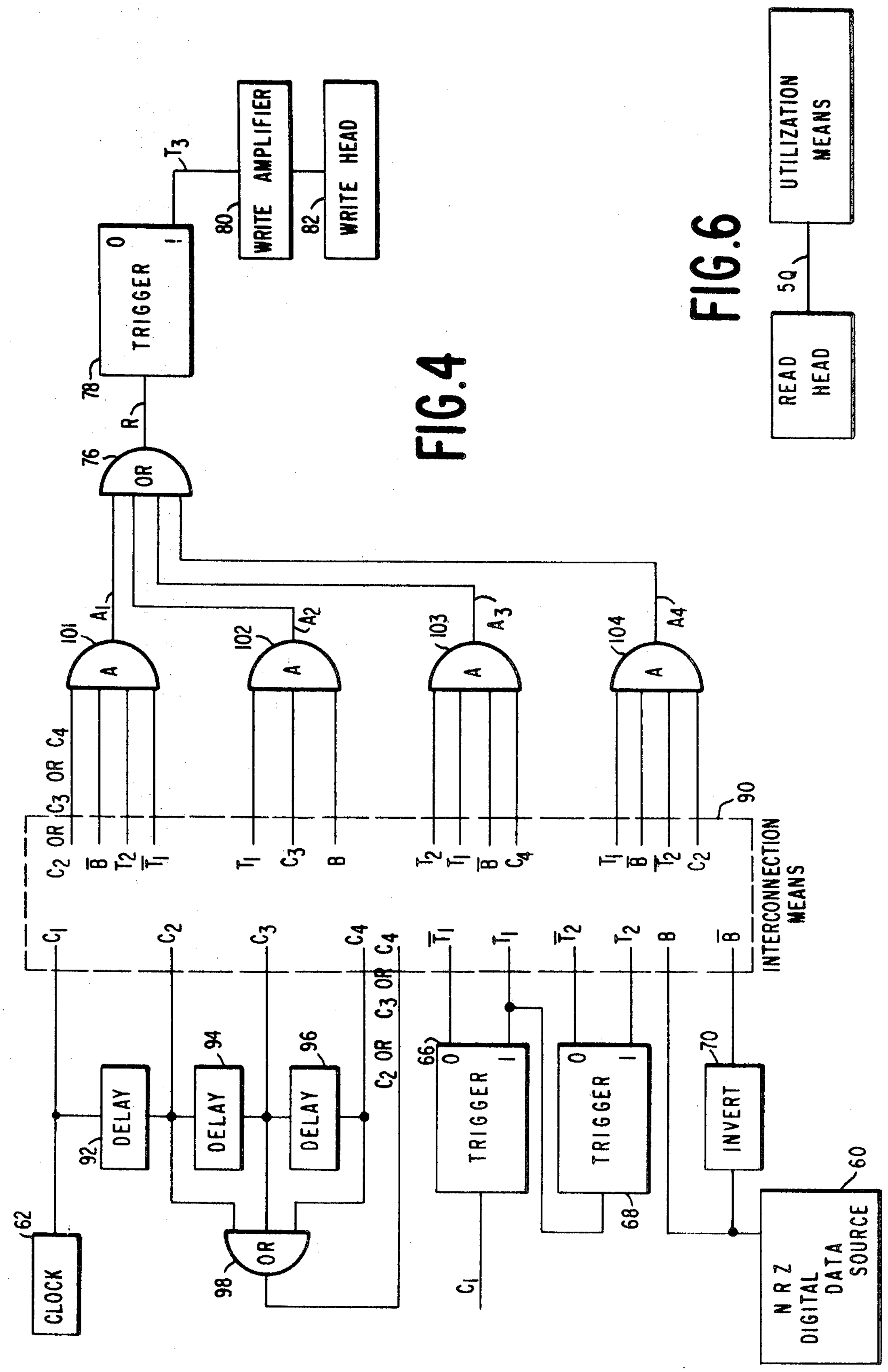
FIG. 4 is a block diagram of a compensated system according to the invention.
FIG. 6 is a block diagram of a readout system for use with the present invention.
Figure 5:
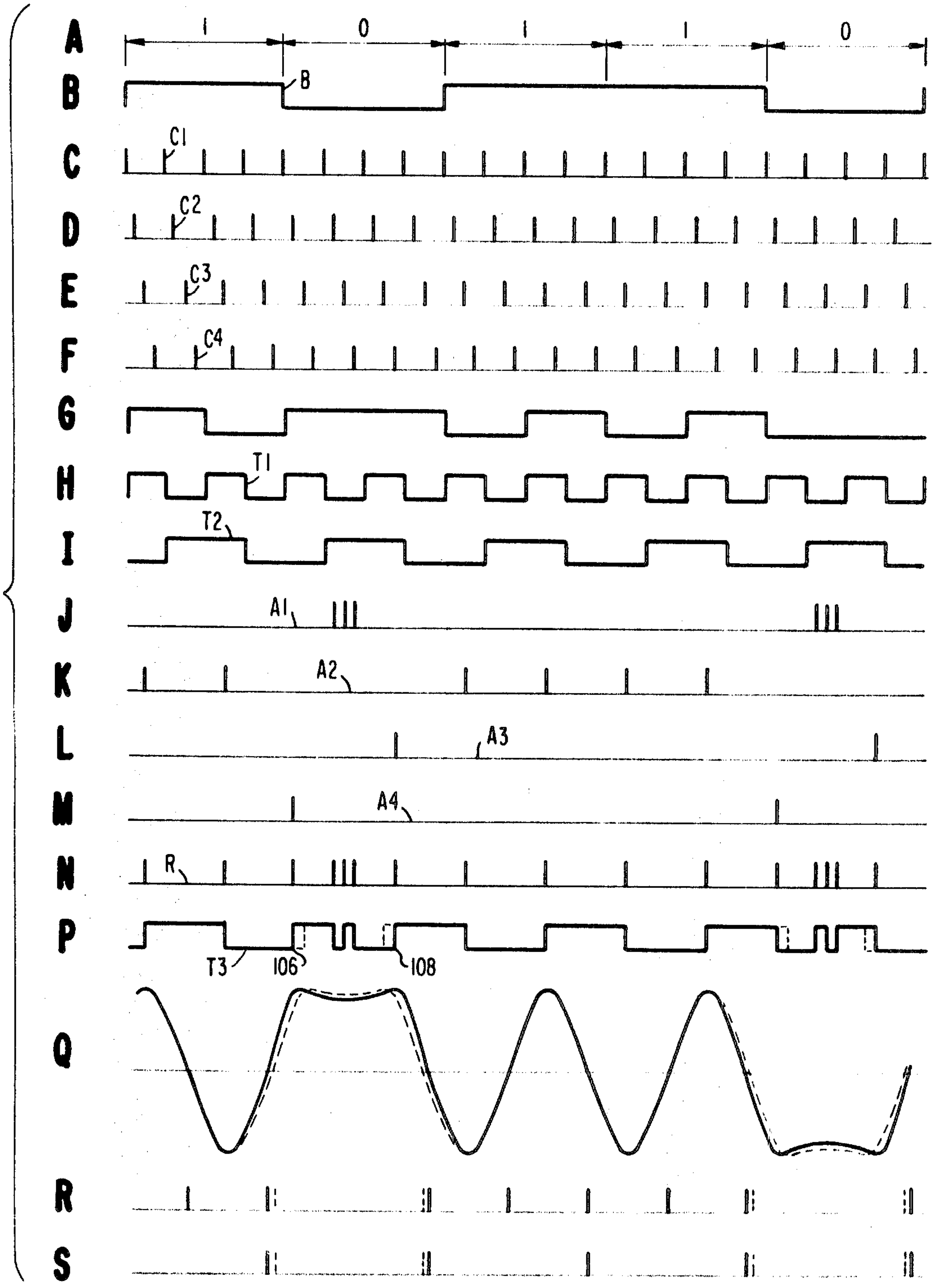
FIGS. 5A–5S are waveform diagrams associated with FIG. 4.

FIG. 4 is a block diagram of an alternate embodiment of the present invention, a compensated predifferentiated FM recording system. FIGS. 5A–5S are diagrams of waveforms associated with the compensated system. The compensation eliminates small errors in zero-crossing time associated with the uncompensated system.

Figure 3:
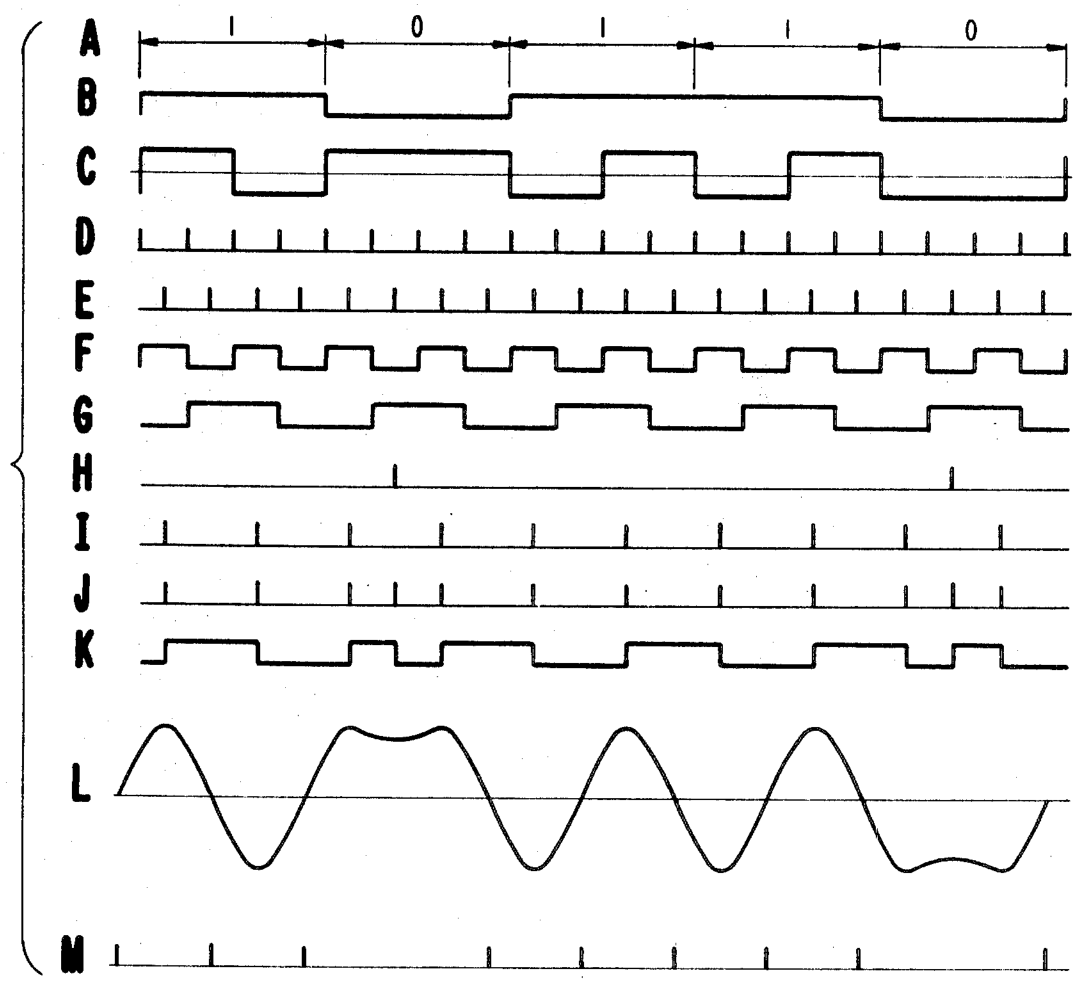
FIGS. 3A–3M are waveform diagrams associated with FIG. 2.

As in the system of FIG. 3, a data source 60, a clock 62, two triggers 66 and 68, an inverter 70, an OR gate 76, trigger 78, write amplifier 80 and write-head 82 are provided for corresponding purposes.

Clock 62 provides a clock signal C1 to an interconnection means 90 and to a delay means 92. Delay means 92 provides a clock pulse train $C_2$, delayed by about one quarter of a clock period from $C_1$. $C_2$ is applied to the interconnection means 90 and to a delay means 94. Delay means 94 provides a clock pulse train $C_3$, delayed by about one quarter of a clock period from $C_2$. $C_3$ is applied to the interconnection means and to a delay means 96. Delay means 96 provides a clock pulse train $C_4$, delayed by about one-quarter of a clock period from $C_3$. $C_4$ is applied to the interconnection means 90. Clock signals $C_2$, $C_3$ and $C_4$ are also applied to an OR gate 98 to generate a $C_2$ OR $C_3$ OR $C_4$ signal, which is applied to the interconnection means 90.

Trigger 61 also receives clock signal $C_1$ to generate successive OFF signals $\overline{T}_1$ and ON signals $T_1$. The $T_1$ signals are applied to the second trigger to generate OFF signals $\overline{T}_2$ and ON signals $T_2$. Signals $T_1$, $T_2$, $\overline{T}_1$, and $\overline{T}_2$ are applied to interconnection means 90. Data signals B and inverted data signals $\overline{B}$ are also applied to interconnection means 90.

I terconnection means 90 is a maze of wires (not illustrated) to make connections from the labeled inputs to the labeled outputs.

AND gate 101 mechanized the Boolean function $A_1$=($C_2$ OR $C_3$ OR $C_4$) AND $\overline{B}$ AND $T_2$ AND $\overline{T}_1$ to generate the signal $A_1$ illustrated in FIG. 5J. AND gate 102 mechanized the function $A_2$=$T_1$ AND $C_3$ AND B to generate the signal $A_2$ illustrated in FIG. 5K. AND gate 103 mechanizes the function $A_3$=$T_2$ AND $T_1$ AND $\overline{B}$ AND $C_4$ to generate the signal $A_3$ illustrated in FIG. 5L. AND gate 104 mechanizes the function $A_4$=$T_1$ AND $\overline{B}$ AND $\overline{T}_2$ AND $C_2$ to generate the signal $A_4$ illustrated in FIG. 5M.

Signals $A_1$, $A_2$, $A_3$ and $A_4$ are combined by OR gate 76 to generate a signal R as illustrated in FIG. 5N where R=$A_1$ OR $A_2$ OR $A_3$ OR $A_4$. The signal R is applied to trigger 78 to generate the write current signal $T_3$ illustrated in FIG. 5P. Broken lines in the FIG. 5P curve indicate where the zero-crossings would occur without compensation.

Writing with the signal of FIG. 5P yields a recording, which, when read back, produces the read voltage illustrated in FIG. 5Q. Here also, broken lines indicate the uncompensated curve. The zero-crossings of the read voltage are illustrated in FIG. 5R and the recovered read clock is shown in FIG. 5S.

FIG. 5G illustrates the FM version of the data signal, and it will be seen that the data pulses (non-clock pulses) of FIG. 5R match the one-bit transitions of FIG. 5G (with a slight phase shift).

In the operation of the system, data is received in one form (NRZ) and is converted to form a write current ($T_3$) which is so formed that the resulting recorded waveform, when read back as a read voltage, contains the digital data in another form FM as represented by zero-crossings of the read voltage.

The delays used in the FIG. 4 system assure that triggers 66 and 68 are settled before their output is taken. Delay 92 also introduces lead compensation for transition 106 in FIG. 5P. Delay 96 introduces lag compensation for transition 108. The dotted lines show where the crossings would occur if the system were uncompensated, as in FIG. 2.

Although this system has been illustrated in connection with FM recording, it is equally applicable to phase encoding (PE), modified frequency modulation (MFM), modified NRZ encoding (MZE), or synchronized NRZ (i.e. NRZ with sync bits).

FIG. 6 illustrates a read head, and a data utilization means receiving data, corresponding to FIG. 5Q, from the read had. The figure indicates that no differentiation is needed between the read head and the utilization means.

While the invention has been particularly shown aNd described herein with reference to preferred embodiments thereof, it will be readily apparent to one skilled in the art that various changes in form and detail may be made therein without departing from the spirit and scope of the invention.

I claim:

1. A system for recording high density digital data on a magnetic medium comprising:

a. receiving means for receiving input digital data in an input form, b. processing means for processing said input data to derive a write current signal in a form which is recorded on said magnetic medium, such that said write current signal yields a flux waveform which produces a read voltage having transitions directly indicative of said digital data without intermediate differentiation, said processing means coupled to said receiving means, and c. recording means coupled to said processing means and responsive to said write current signal.

2. A system according to claim 1 wherein said transitions are zero-crossings.

3. A system according to claim 1 wherein said processing means further comprises:

a. a source of clock signals, b. first trigger means coupled to said source and responsive to said clock signals for providing timing signals, c. delay means coupled to said source for providing delayed clock pulses, d. gate means coupled to said delay means, to said first trigger means and to said receiving means, and responsive to said delayed clock pulses, said timing signals, and said input digital data for generating a train of timing pulses and data pulses between said timing pulses, said data pulses representing the occurrence of input digital data of a predetermined one of the two binary types of said input digital data, and e. second trigger means coupled to said gate means and responsive at its input to said train of timing pulses and data pulses for generating said write current by switching output states at the occurrence of each input pulse.

4. A system according to claim 3 for receiving NRZ digital data and magnetically recording corresponding information to cause FM data to be read out without differentiation, wherein a. said first trigger means comprises first and second triggers, said first trigger being operated by said clock signals and said second trigger being operated by an output from said first trigger, b. said gate means comprises first and second AND gates and an OR gate, said first AND gate receiving as inputs said output from said first trigger and said delayed clock pulses to provide a first AND gate output, said second AND gate receiving as inputs an output from said second trigger, said delayed clock pulses, and said NRZ digital data to provide a second AND gate output, said OR gate receiving said first and said second AND gate outputs to provide an OR gate output, and c. said second trigger means comprising a third trigger responsive to said OR gate output to provide an indication of said write current.

5. A system according to claim 3 further comprising means for inserting extra pulses between said timing pulses for causing said write current to switch states rapidly during intervals when said read voltage must remain in one polarity for a relatively long time.

6. A system according to Claim 5 for receiving NRZ digital data and magnetically recording corresponding information to cause FM data to be read out without differentiation, wherein a. said delay means comprises first delay means for receiving said clock pulses for providing first delayed clock pulses, second delay means for receiving said first delayed clock pulses for providing second delayed clock pulses, and third delay means for receiving said second delayed clock pulses for providing third delayed clock pulses, b. said first trigger means comprises first and second triggers, said first trigger being operated by said clock signals to provide a first trigger ON signal and a first trigger OFF signal, said second trigger being operated by said first trigger ON signal to provide a second trigger ON signal and a second trigger OFF signal, c. said gate means comprises first, second, third and fourth AND gate means and an OR gate means, c1. said first AND gate means being responsive to the occurrence of at least one of said first, second, and third delayed clock pulses, to a signal representing an inverted form of said NRZ digital data, to said first trigger OFF signal and to said second trigger ON signal to provide a first gate indication.

c2. said second AND gate means being responsive to said first trigger ON signal, said second delayed clock pulses and said NRZ digital data to provide a second gate indication, c3. said third AND gate means being responsive to said first trigger ON signal, said second trigger ON signal, said signal representing an inverted form of said NRZ digital data and said third delayed clock pulses to provide a third gate indication, c4. said fourth AND gate means being responsive to said first trigger ON signal, said second trigger OFF signal, said signal representing an inverted form of said NRZ digital data, and said first delayed clock pulses to provide a fourth gate indication, and c5. said OR gate means being responsive to said first, second, third and fourth gate indications to provide an OR gate output, and d. said second trigger means comprises a third trigger responsive to said OR gate output to provide an indication of said write current.

7. A method of processing a high density digital input signal in order to produce a write current signal for recording on a magnetic medium in order to produce on said medium a flux waveform which, when readout, produces a read voltage at the read head, said read voltage being processable without differentiation to produce a usable digital output signal having the information content of said digital input signal comprising:

a. receiving said digital input signal, b. processing said input signal to generate said write signal, said write signal being recorded and read out such that write signal produces said read voltage having transitions corresponding directly to the digital information content of said input signal, without the differentiation of said read signal, and c. using said write signal to drive a write head for recording on said medium.

8. A method according to claim 7 wherein the processing step includes the step of causing said write signal to rapidly change state during intervals when no transitions are suitable in the read voltage.

9. A method according to claim 7 wherein said transitions are zero-crossings.

UNITED STATES PATENT OFFICE
CERTIFICATE OF CORRECTION

Patent No. 3,603,942 Dated January 13, 1969

Inventor(s) ROBERT F. HEIDECKER

It is certified that error appears in the above-identified patent and that said Letters Patent are hereby corrected as shown below:

Col. 1, line 38 - after "advantages" insert "especially when used with high density data, such as in single track systems with a density of 1600 bits per inch and parallel track systems with a density of 200 bits per inch"
line 75 - insert "occur" after "would"

Col. 3, line 56 - "mechanized" should be "mechanizes"
line 58 - "mechanized" should be "mechanizes"

Col. 4, line 9 - no parenthesis around FM
line 22 - "read had" should be "read head"
line 25 - "aNd" should be "and"

Col. 5, line 37 - delete period (.) and substitute a comma (,)

Signed and sealed this 21st day of March 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
★ U.S. GOVERNMENT PRINTING OFFICE : 1969 O—366-334